(12) United States Patent
Ueda et al.

(10) Patent No.: US 12,548,721 B2
(45) Date of Patent: Feb. 10, 2026

(54) VACUUM CIRCUIT BREAKER

(71) Applicant: Mitsubishi Electric Corporation, Tokyo (JP)

(72) Inventors: Masashi Ueda, Tokyo (JP); Yasunori Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 302 days.

(21) Appl. No.: 18/557,970

(22) PCT Filed: Jul. 12, 2021

(86) PCT No.: PCT/JP2021/026097
§ 371 (c)(1),
(2) Date: Oct. 30, 2023

(87) PCT Pub. No.: WO2023/286112
PCT Pub. Date: Jan. 19, 2023

(65) Prior Publication Data
US 2024/0242907 A1     Jul. 18, 2024

(51) Int. Cl.
*H01H 33/668*     (2006.01)
*H01H 33/662*     (2006.01)

(52) U.S. Cl.
CPC .... *H01H 33/668* (2013.01); *H01H 33/66238* (2013.01)

(58) Field of Classification Search
CPC .... H01H 33/56; H01H 33/561; H01H 33/668; H01H 33/66238; H01H 33/666;
(Continued)

(56) References Cited

U.S. PATENT DOCUMENTS 7,135,652 B2 * 11/2006 Kobayashi ........... H01H 33/666
                                                        218/155
8,110,770 B2    2/2012 Ichikawa et al.
(Continued)

FOREIGN PATENT DOCUMENTS

| JP | 2007306701 A | 11/2007 |
|---|---|---|
| JP | 2011229195 A | 11/2011 |
| JP | 2013055738 A | 3/2013 |

OTHER PUBLICATIONS

International Search Report (PCT/ISA/210) with translation and Written Opinion (PCT/ISA/237) mailed on Sep. 28, 2021, by the Japanese Patent Office as the International Searching Authority for International Application No. PCT/JP2021/026097. (8 pages).

*Primary Examiner* — William A Bolton
(74) *Attorney, Agent, or Firm* — Buchanan Ingersoll & Rooney PC

(57) ABSTRACT

A vacuum circuit breaker includes a grounded tank in which an insulating gas is sealed, a vacuum valve, a movable-side electrode, a fixed-side electrode, a bellows fixed to the movable-side electrode allowed to pass therethrough, to expand and contract in the vacuum valve, a pressure valve regulating gas pressure between a first area enclosed by the bellows and a movable-side frame and a second area enclosed by the grounded tank outside the first area, a pressure release valve releasing the insulating gas from the first area to the outside of the grounded tank, and an anomaly determination unit determining leak of the insulating gas from the grounded tank, based on a gas pressure in the second area measured by a pressure sensor.

7 Claims, 2 Drawing Sheets

(58) Field of Classification Search
CPC .............. H01H 33/563; H02B 13/0354; H02B 13/025; H02B 13/055; H02B 13/065; H01R 3/00
USPC ....... 218/139, 118, 122, 123, 134, 138, 140, 218/153, 156, 155
See application file for complete search history.

(56) References Cited

U.S. PATENT DOCUMENTS

| | | | | |
|---|---|---|---|---|
| 8,895,884 | B2* | 11/2014 | Yamamoto | H01H 33/666 |
| | | | | 218/7 |
| 9,214,306 | B2* | 12/2015 | Yoshida | H01H 33/565 |
| 10,014,140 | B2* | 7/2018 | Dullni | H01H 33/66238 |
| 10,262,819 | B2* | 4/2019 | Nagatake | C22C 27/06 |
| 10,650,994 | B2* | 5/2020 | Bauer | H01H 33/42 |
| 2012/0103941 | A1* | 5/2012 | Nakayama | H02B 13/0354 |
| | | | | 218/134 |
| 2012/0160810 | A1* | 6/2012 | Ohtsuka | H02B 13/0354 |
| | | | | 218/140 |
| 2014/0076851 | A1* | 3/2014 | Yano | H01H 33/40 |
| | | | | 218/120 |
| 2015/0270080 | A1* | 9/2015 | Inoue | H01H 33/668 |
| | | | | 218/122 |

\* cited by examiner

VACUUM CIRCUIT BREAKER

FIELD

The present disclosure relates to tank-shaped vacuum circuit breakers.

BACKGROUND

A tank-shaped vacuum circuit breaker that drives an interrupter housed in a grounded tank by an actuator includes a vacuum valve constituting the interrupter. A bellows is provided in the vacuum valve. On the outer peripheral side of the bellows, a vacuum is maintained by the vacuum valve, whereas on the inner peripheral side, a high pressure is created by the addition of an insulating gas. Thus, when a pressure difference develops between the inside and outside of the bellows, the bellows is damaged by buckling, and its mechanical life is reduced.

To prevent the reduction in life, a vacuum circuit breaker of Patent Literature 1 reduces the pressure difference between the inside and outside of the bellows by creating a vacuum on the outer peripheral side of the bellows and creating, on the inner peripheral side, atmospheric pressure or an intermediate gas pressure between a high-pressure insulating gas and a vacuum.

CITATION LIST

Patent Literature

Patent Literature 1: Japanese Patent Application Laid-open No. 2007-306701

SUMMARY OF INVENTION

Problem to be Solved by the Invention

However, to ensure the soundness of equipment performance, the technique of Patent Literature 1 requires monitoring of a plurality of gas pressure sections for their individual gas pressures, disadvantageously increasing maintenance costs.

The present disclosure has been made in view of the above. It is an object of the present disclosure to provide a vacuum circuit breaker that can achieve current interruption at low maintenance costs.

Means to Solve the Problem

To solve the above-described problem and achieve the object, a vacuum circuit breaker of the present disclosure includes a cylindrical grounded tank in which an insulating gas is sealed, a vacuum valve insulated and supported in the grounded tank, the vacuum valve including a movable-side contact and a fixed-side contact, a movable-side electrode electrically connected to the movable-side contact, and a fixed-side electrode electrically connected to the fixed-side contact. The vacuum circuit breaker of the present disclosure also includes a movable-side bushing extending above the grounded tank, a fixed-side bushing extending above the grounded tank, a movable-side frame electrically connecting the lower end of the movable-side bushing to the movable-side electrode, and a fixed-side frame electrically connecting the lower end of the fixed-side bushing to the fixed-side electrode. The vacuum circuit breaker of the present disclosure also includes an insulated operating rod that moves the movable-side electrode, a movable-side insulator insulating and supporting the movable-side frame in the grounded tank, a fixed-side insulator insulating and supporting the fixed-side frame in the grounded tank, a movable-side flange covering a movable-side end portion of the grounded tank, a fixed-side flange covering a fixed-side end portion of the grounded tank, and a bellows disposed in the vacuum valve, the bellows allowing the movable-side electrode to pass through and being fixed to the movable-side electrode, to expand and contract with the movement of the movable-side electrode. The vacuum circuit breaker of the present disclosure also includes a pressure valve that regulates the pressure of the insulating gas between a first area enclosed by the bellows, the movable-side frame, the movable-side insulator, and the movable-side flange and a second area enclosed by the grounded tank, the movable-side flange, and the fixed-side flange outside the first area. The vacuum circuit breaker of the present disclosure also includes a pressure release valve that releases the insulating gas from the first area to the outside of the grounded tank, a pressure sensor that measures a gas pressure in the second area, and an anomaly determination unit that determines whether or not the insulating gas has leaked from the grounded tank, based on the gas pressure measured by the pressure sensor. A first gas pressure that is a gas pressure in the first area is lower than a second gas pressure that is the gas pressure in the second area. The pressure valve opens when a first pressure difference obtained by subtracting the first gas pressure from the second gas pressure exceeds a first specific value. The pressure release valve opens when a second pressure difference obtained by subtracting a pressure outside the grounded tank from the first gas pressure exceeds a second specific value.

Effects of the Invention

The vacuum circuit breaker according to the present disclosure has the effect of being able to achieve current interruption at low maintenance costs.

DESCRIPTION OF EMBODIMENTS

Hereinafter, a vacuum circuit breaker according to embodiments of the present disclosure will be described in detail with reference to the drawings.

First Embodiment

Figure 1:
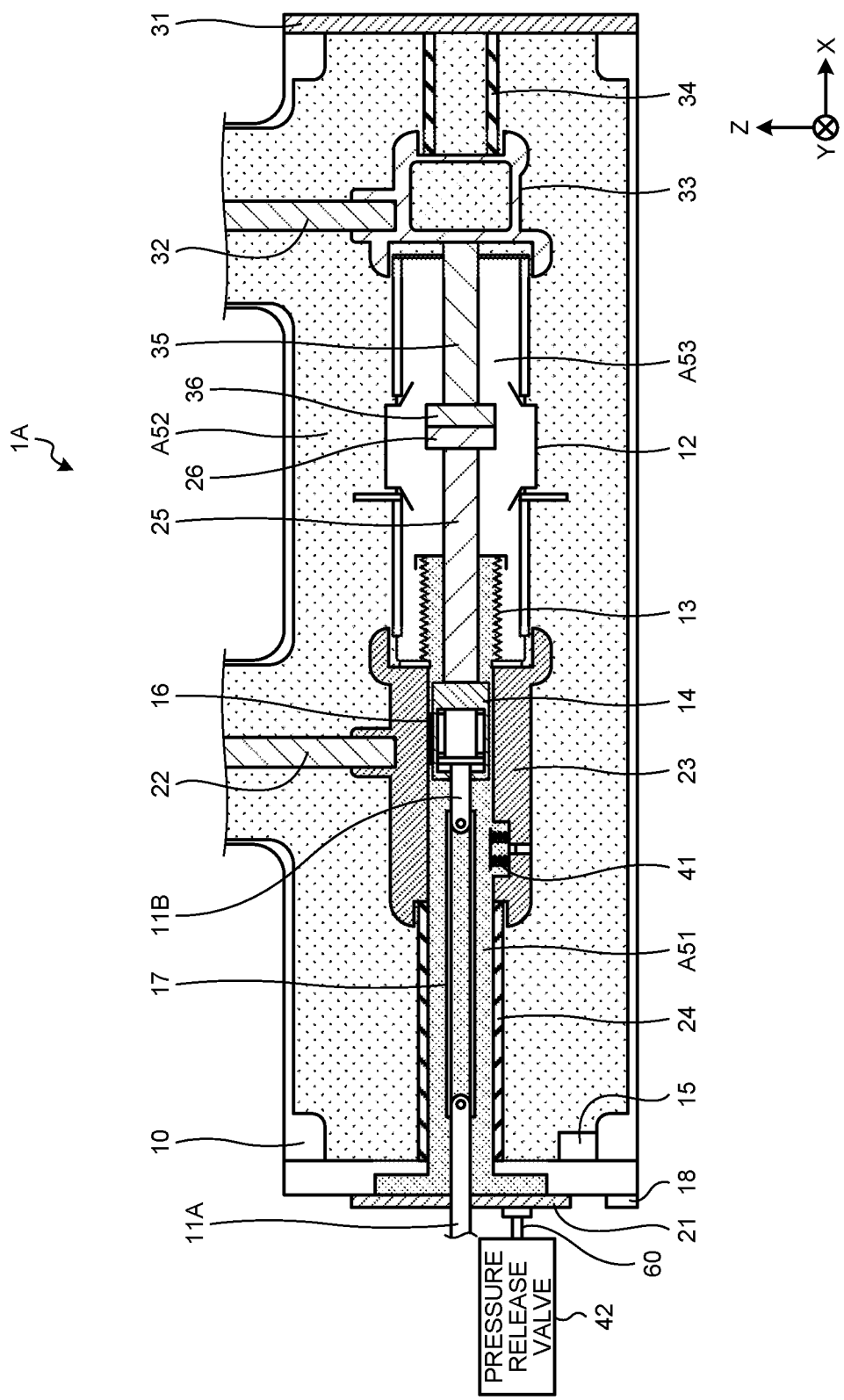
FIG. 1 is a diagram illustrating a configuration of a vacuum circuit breaker according to a first embodiment.

FIG. 1 is a diagram illustrating a configuration of a vacuum circuit breaker according to a first embodiment. FIG. 1 illustrates a cross-sectional view of a vacuum circuit breaker 1A. In the following description, two axes in a horizontal plane that are orthogonal to each other are referred to as an X axis and a Y axis. An axis orthogonal to the X axis and the Y axis is referred to as a Z axis. Here, description is given of a case where the cylinder axis direction of the vacuum circuit breaker 1A is the X-axis direction. In FIG. 1, the right direction is the X-axis direction, and the sheet depth direction is the Y-axis direction.

The vacuum circuit breaker 1A is a tank-shaped vacuum circuit breaker. The vacuum circuit breaker 1A includes a grounded tank 10, shafts 11A and 11B, a movable-side flange 21, and a fixed-side flange 31. The vacuum circuit breaker 1A includes a movable-side insulator 24, a fixed-side insulator 34, a movable-side frame 23, and a fixed-side frame 33. The vacuum circuit breaker 1A includes a vacuum valve 12, a bellows 13, an insulated operating rod 17, a movable-side electrode 25, a fixed-side electrode 35, a movable-side contact 26, and a fixed-side contact 36. The vacuum circuit breaker 1A includes a contact pressure spring unit 14, a connecting member 16, a pressure valve 41, a pressure release valve 42, a gas pipe 60, and a pressure sensor 15. The vacuum circuit breaker 1A includes a movable-side bushing 22 and a fixed-side bushing 32. The vacuum circuit breaker 1A includes an anomaly determination unit 18.

The pressure valve 41 and the pressure release valve 42 constituting a pressure regulation mechanism are disposed at appropriate locations, to allow the vacuum circuit breaker 1A to reduce gas pressure monitoring locations to a single location. That is, the vacuum circuit breaker 1A monitors for pressure anomalies in the vacuum circuit breaker 1A with the single pressure sensor 15.

The grounded tank 10 has a cylindrical shape, in which an insulating gas is sealed. The movable-side flange 21 is disposed at one end of the grounded tank 10 in the cylinder axis direction (X-axis direction). The movable-side flange 21 is connected to the grounded tank 10 at the top surface (left end face) that is an end portion of the cylindrical grounded tank 10, covering the top surface of the grounded tank 10. The movable-side flange 21 and the grounded tank 10 are hermetically sealed with a sealing material such as an O-ring.

The fixed-side flange 31 is disposed at the opposite end of the grounded tank 10 in the cylinder axis direction. The fixed-side flange 31 is connected to the grounded tank 10 at the bottom surface (right end face) that is an end portion of the cylindrical grounded tank 10, covering the bottom surface of the grounded tank 10. The fixed-side flange 31 and the grounded tank 10 are hermetically sealed with a sealing material such as an O-ring.

Thus, the movable-side end portion of the grounded tank 10 is covered with the movable-side flange 21, and the fixed-side end portion of the grounded tank 10 is covered with the fixed-side flange 31.

The movable-side insulator 24 has a cylindrical shape, in which the insulating gas is sealed. One end of the movable-side insulator 24 in the X-axis direction, which is the cylinder axis direction, is connected to the back side of the movable-side flange 21 inside the grounded tank 10. The opposite end of the movable-side insulator 24 in the cylinder axis direction is connected to one end of the movable-side frame 23. Thus, the movable-side insulator 24 insulates and supports the movable-side frame 23 in the grounded tank 10. The movable-side insulator 24 and the movable-side frame 23 are hermetically sealed with a sealing material such as an O-ring.

The fixed-side insulator 34 is connected to the back side of the fixed-side flange 31 inside the grounded tank 10. The fixed-side insulator 34 insulates and supports the fixed-side frame 33 in the grounded tank 10.

The movable-side frame 23 has a cylindrical shape, in which the insulating gas is sealed as in the movable-side insulator 24. The movable-side frame 23 electrically connects the lower end of the movable-side bushing 22 to the movable-side electrode 25. The fixed-side frame 33 electrically connects the lower end of the fixed-side bushing 32 to the fixed-side electrode 35. The shaft 11A extends in the X-axis direction.

The shaft 11A is inserted through a through hole provided in the movable-side flange 21 from the outside of the vacuum circuit breaker 1A, into the movable-side insulator 24. One end of the shaft 11A in the X-axis direction, which is the column axis direction, is connected to an actuator (not illustrated) provided outside the grounded tank 10, to operate the movable-side contact 26. The opposite end of the shaft 11A in the column axis direction is connected to the insulated operating rod 17 in the movable-side insulator 24. The shaft 11A moves in the X-axis direction inside the movable-side insulator 24 under control of the actuator.

The insulated operating rod 17 extends in the X-axis direction. One end of the insulated operating rod 17 in the X-axis direction, which is the axial direction, is connected to the opposite end of the shaft 11A. The opposite end of the insulated operating rod 17 in the axial direction is connected to one end of the movable-side electrode 25 via the shaft 11B and the contact pressure spring unit 14. When the shaft 11A moves in the X-axis direction, the insulated operating rod 17 moves in the X-axis direction inside the movable-side insulator 24 and inside the fixed-side insulator 34.

The contact pressure spring unit 14 is disposed inside the movable-side frame 23. One end of the contact pressure spring unit 14 in the X-axis direction is connected to the insulated operating rod 17, and the opposite end of the contact pressure spring unit 14 in the X-axis direction is electrically connected to the movable-side electrode 25. The contact pressure spring unit 14 includes a contact pressure spring that can apply a contact pressure in a closing state. The contact pressure spring unit 14 moves with the movement of the insulated operating rod 17.

The contact pressure spring unit 14 applies, to the movable-side electrode 25, a force that presses the movable-side contact 26 against the fixed-side contact 36 at the time of contact closing. This ensures current-carrying performance between the movable-side contact 26 and the fixed-side contact 36 at the time of contact closing. The contact pressure spring unit 14 is electrically connected to the movable-side frame 23 via the conductive connecting member 16 such as a multi-contact. Instead of the contact pressure spring unit 14, an elastic unit including an elastic body other than a contact pressure spring may be disposed.

The movable-side electrode 25 has an axial shape and extends in the X-axis direction. One end of the movable-side electrode 25 in the X-axis direction is electrically connected to the contact pressure spring unit 14, and the opposite end of the movable-side electrode 25 in the X-axis direction is electrically connected to the movable-side contact 26 in the vacuum valve 12. The movable-side electrode 25 moves with the movement of the insulated operating rod 17 and the contact pressure spring unit 14.

The bellows 13 is disposed inside the vacuum valve 12. The bellows 13 can expand and contract in the X-axis direction. The bellows 13 allows the movable-side electrode 25 to pass therethrough. One end of the bellows 13 in the X-axis direction is connected to the contact pressure spring unit 14, and the opposite end of the bellows 13 in the X-axis direction is connected to the movable-side electrode 25. The bellows 13 is open at the opposite end in the X-axis direction, and is connected to the inside of the movable-side frame 23. That is, the inside of the bellows 13 is connected to the inside of the movable-side frame 23.

The bellows 13 is fixedly connected to the movable-side electrode 25 at the opposite end in the X-axis direction, and expands and contracts as the movable-side electrode 25 moves. That is, the bellows 13 expands and contracts, following the movement of the movable-side electrode 25. The bellows 13 and the vacuum valve 12 are joined by means of brazing, welding, or the like. The provision of the bellows 13 allows the vacuum circuit breaker 1A to move the movable-side electrode 25 while maintaining the vacuum inside the vacuum valve 12.

The fixed-side electrode 35 has an axial shape and extends in the X-axis direction. One end of the fixed-side electrode 35 in the X-axis direction is electrically connected to the fixed-side contact 36, and the opposite end of the fixed-side electrode 35 in the X-axis direction is electrically connected to the fixed-side frame 33.

The vacuum valve 12 extends in the X-axis direction. The vacuum valve 12 is insulated and supported in the grounded tank 10 by the movable-side frame 23 and the fixed-side frame 33. Specifically, one end of the vacuum valve 12 in the X-axis direction is connected to the opposite end of the movable-side frame 23, and the opposite end of the vacuum valve 12 in the X-axis direction is connected to one end of the fixed-side frame 33. The vacuum valve 12 and the movable-side frame 23 are hermetically sealed with a sealing material such as an O-ring. An area in the vacuum valve 12 is an area A53, in which a vacuum is maintained.

The movable-side contact 26 and the fixed-side contact 36 are disposed in the vacuum valve 12. The movable-side contact 26 is connected to the opposite end of the movable-side electrode 25. The fixed-side contact 36 is connected to one end of the fixed-side electrode 35.

The driving force of the actuator is transmitted to the movable-side contact 26 via the shaft 11A, the insulated operating rod 17, the contact pressure spring unit 14, and the movable-side electrode 25. Under the driving force of the actuator, the movable-side contact 26 can take a closing state of being in contact with the fixed-side contact 36 and an interrupting state of being apart from the fixed-side contact 36.

The movable-side bushing 22 and the fixed-side bushing 32 extend above the grounded tank 10. The movable-side bushing 22 and the fixed-side bushing 32 are made from conductors. The movable-side bushing 22 is electrically connected to the movable-side frame 23. The fixed-side bushing 32 is electrically connected to the fixed-side frame 33.

When the movable-side contact 26 is connected to the fixed-side contact 36, the movable-side electrode 25 is connected to the fixed-side electrode 35. Consequently, the movable-side bushing 22 is connected to the fixed-side bushing 32. That is, the movable-side bushing 22 is connected to the fixed-side bushing 32 via the movable-side frame 23, the connecting member 16, the contact pressure spring unit 14, the movable-side electrode 25, the fixed-side electrode 35, the movable-side contact 26, the fixed-side contact 36, and the fixed-side frame 33.

As described above, in the vacuum circuit breaker 1A, the vacuum valve 12, the fixed-side frame 33, the fixed-side insulator 34, the movable-side frame 23, the movable-side insulator 24, the contact pressure spring unit 14, the insulated operating rod 17, and the shaft 11A are coaxially disposed and are connected to each other inside the grounded tank 10. In the vacuum circuit breaker 1A, the movable-side electrode 25 in the vacuum valve 12 is operated by the shaft 11A via the contact pressure spring unit 14, the shaft 11B, and the insulated operating rod 17.

An area A51 in the vacuum circuit breaker 1A is an area (pressure space) enclosed by the movable-side flange 21, the bellows 13, the movable-side frame 23, and the movable-side insulator 24. An area A52 in the vacuum circuit breaker 1A is an area outside the movable-side insulator 24, the movable-side frame 23, and the vacuum valve 12, and is an area enclosed by the grounded tank 10. That is, the area A52 is an area (pressure space) enclosed by the grounded tank 10, the fixed-side flange 31, and the movable-side flange 21, other than the area A51 and the area A53. In other words, the area A52 is a pressure space except the area A51 and the area A53 in the pressure space in the grounded tank 10.

The gas pressure of the insulating gas in the area A51 is lower than the gas pressure of the insulating gas in the area A52. That is, the area A51 is a low-pressure gas section in which the gas pressure of the insulating gas is lower than that in the area A52, and the area A52 is a high-pressure gas section in which the gas pressure of the insulating gas is higher than that in the area A51.

The pressure sensor 15 is disposed in the area A52, and measures the gas pressure in the area A52. The pressure sensor 15 is disposed, for example, near a pipe to allow the insulating gas to flow into the area A52, or the like. The pressure sensor 15 is connected to the anomaly determination unit 18, and sends a measured gas pressure to the anomaly determination unit 18. The anomaly determination unit 18 determines whether or not the gas pressure sent from the pressure sensor 15 has become equal to or lower than a threshold.

When the gas pressure sent from the pressure sensor 15 has become equal to or lower than the threshold, the anomaly determination unit 18 outputs anomaly information indicating that the gas pressure has become equal to or lower than the threshold. The anomaly determination unit 18 may output the anomaly information by voice, or may output the anomaly information by displaying text, graphics, or the like. The anomaly determination unit 18 may only output the gas pressure itself sent from the pressure sensor 15. Also in this case, the anomaly determination unit 18 may output the gas pressure itself sent from the pressure sensor 15 by voice or by displaying text, graphics, or the like.

The pressure valve 41 is disposed between the area A51 and the area A52. The pressure valve 41 is attached, for example, to the inside of the movable-side frame 23. The pressure valve 41 sends the insulating gas in the area A52 to the area A51. The pressure valve 41 opens when the pressure difference between the gas pressure in the area A51, which is the area inside the movable-side frame 23, and the gas pressure in the area A52, which is the area outside the movable-side frame 23, exceeds a specific value P1, and closes when the pressure difference becomes equal to or lower than the specific value P1. A first pressure difference that is the pressure difference between the gas pressure in the area A51 and the gas pressure in the area A52 is a value obtained by subtracting the gas pressure in the area A51 from the gas pressure in the area A52. The gas pressure in the area A51 is a first gas pressure, and the gas pressure in the area A52 is a second gas pressure.

The pressure release valve 42 is attached to the movable-side flange 21 via the gas pipe 60. The gas pipe 60 is connected to the area A51 through the movable-side flange 21. The pressure release valve 42 releases the gas in the area A51 to the atmosphere. When the pressure difference between the gas pressure in the area A51 and the gas pressure in an area outside the grounded tank 10 (the atmosphere) exceeds a specific value P2, the pressure release valve 42 releases the insulating gas in the area A51 to the area outside the grounded tank 10. The pressure release valve 42 opens when the pressure difference between the gas pressure in the area A51 and the pressure in the area outside the grounded tank 10 exceeds the specific value P2, and closes when the gas pressure falls below a guaranteed minimum gas pressure for the area A51. A second pressure difference that is the pressure difference between the gas pressure in the area A51 and the pressure in the area outside the grounded tank 10 is a value obtained by subtracting the pressure in the area outside the grounded tank 10 from the gas pressure in the area A51. The specific value P1 is a first specific value, and the specific value P2 is a second specific value.

The gas pressures in the vacuum circuit breaker 1A change in the following three cases:
 (i) A gas leak from the area A51 to the outside of the grounded tank 10
 (ii) A gas leak from the area A52 to the area A51
 (iii) A gas leak from the area A52 to the atmosphere Here, a rated gas pressure for the area A51 is referred to as a rated gas pressure $P_{L1}$, and the guaranteed minimum gas pressure as a guaranteed minimum gas pressure $P_{L2}$ ($P_{L1} > P_{L2}$). A guaranteed maximum gas pressure for the area A51 that guarantees the mechanical life of the bellows 13 is referred to as a guaranteed maximum gas pressure $P_{L3}$ ($P_{L3} > P_{L1}$). A rated gas pressure for the area A52 is referred to as a rated gas pressure $P_{H1}$, and a guaranteed minimum gas pressure (the threshold) as a guaranteed minimum gas pressure $P_{H2}$ ($P_{H1} > P_{H2}$).

For example, the rated gas pressure $P_{L1}$ is 0.2 MPaG, the guaranteed minimum gas pressure $P_{L2}$ is 0.15 MPaG, the rated gas pressure $P_{H1}$ is 1.0 MPaG, and the guaranteed minimum gas pressure $P_{H2}$ is 0.95 MPaG. For example, the pressure valve 41 opens when the pressure difference between the areas A51 and A52 exceeds 0.8 MPa, and the pressure release valve 42 opens when the pressure difference between the area A51 and the atmosphere outside the vacuum circuit breaker 1A exceeds 0.25 MPaG.

When a gas leak in case (i) described above occurs, the gas pressure in the area A51 decreases. As a result, the gas pressure in the area A51 falls below the guaranteed minimum gas pressure $P_{L2}$. In this case, when the gas pressure difference between the area A51 and the area A52 exceeds the specific value P1 (P1=$P_{H1}$-$P_{L2}$), the pressure valve 41 attached between the areas A51 and A52 opens, and the gas is sent from the area A52 into the area A51.

The pressure valve 41 closes when the gas pressure difference between the area A51 and the area A52 becomes equal to or lower than the specific value P1. When a gas leak from the area A51 to the outside of the grounded tank 10 continuously occurs, and the pressure valve 41 operates repeatedly, the gas pressure in the area A52 falls below the guaranteed minimum gas pressure $P_{H2}$. Therefore, the vacuum circuit breaker 1A can detect a gas leak in case (i) by monitoring only the gas pressure in the area A52 with the pressure sensor 15. When the pressure sensor 15 detects a gas pressure lower than, for example, 0.95 MPaG, the anomaly determination unit 18 determines that a gas leak has occurred.

When a gas leak in case (ii) described above occurs, the gas pressure in the area A51 increases. When the gas pressure in the area A51 continues to increase and exceeds the guaranteed maximum gas pressure $P_{L3}$, the pressure difference between the outside of the grounded tank 10 and the area A51 exceeds the specific value P2. In this case, the pressure release valve 42 operates to release the insulating gas in the area A51.

The pressure release valve 42 closes when the gas pressure in the area A51 becomes equal to or lower than the guaranteed minimum gas pressure $P_{L2}$. When a gas leak from the area A52 to the area A51 continuously occurs, and the pressure release valve 42 operates repeatedly, the gas pressure in the area A52 falls below the guaranteed minimum gas pressure $P_{H2}$. Therefore, the vacuum circuit breaker 1A can detect a gas leak in case (ii) by monitoring only the gas pressure in the area A52 with the pressure sensor 15.

When a gas leak in case (iii) described above occurs, the vacuum circuit breaker 1A only needs to monitor the gas pressure in the area A52 with the pressure sensor 15.

As described above, the vacuum circuit breaker 1A includes the pressure valve 41 and the pressure release valve 42, and thus can detect all the gas leak cases only by monitoring the gas pressure in the area A52 if the operating pressures of the pressure valve 41 and the pressure release valve 42 are appropriately set.

A vacuum circuit breaker not including the pressure valve 41 and the pressure release valve 42 needs to monitor the gas pressures in the areas A51 and A52 with two pressure sensors. By contrast, the vacuum circuit breaker 1A includes the pressure valve 41 and the pressure release valve 42, and thus can monitor the gas pressures in the areas A51 and A52 with the single pressure sensor 15. This reduces the maintenance costs.

Furthermore, at the time of enclosing gas in the vacuum circuit breaker 1A, when the insulating gas is enclosed in the area A52, the insulating gas is also enclosed in the area A51 automatically at a specified gas pressure, so that work saving can be achieved.

The pressure valve 41 and the pressure release valve 42 may include counters that count the numbers of opening and closing operations. In this case, the pressure valve 41 and the pressure release valve 42 are connected to the anomaly determination unit 18, and send the counted numbers of operations to the anomaly determination unit 18. The anomaly determination unit 18 determines which gas leak case has occurred, based on the number of operations counted by the pressure valve 41 and the number of operations counted by the pressure release valve 42. The anomaly determination unit 18 outputs a determination result. The anomaly determination unit 18 may output the determination result by voice, or may output the determination result by displaying text, graphics, or the like.

When, for example, the number of operations counted by the pressure valve 41 exceeds a first reference value, and the number of operations counted by the pressure release valve 42 is equal to or lower than a second reference value, the anomaly determination unit 18 determines that a gas leak in case (i) has occurred. Note that the anomaly determination unit 18 may determine that a gas leak in case (i) has occurred when, for example, the number of operations counted by the pressure valve 41 exceeds the first reference value.

When, for example, the number of operations counted by the pressure release valve 42 exceeds a third reference value, and the number of operations counted by the pressure valve 41 is equal to or lower than a fourth reference value, the anomaly determination unit 18 determines that a gas leak in case (ii) has occurred. Note that the anomaly determination unit 18 may determine that a gas leak in case (ii) has occurred when, for example, the number of operations counted by the pressure release valve 42 exceeds the third reference value.

When, for example, the number of operations counted by the pressure valve 41 is equal to or lower than a fifth reference value, and the number of operations counted by the pressure release valve 42 is equal to or lower than a sixth reference value, the anomaly determination unit 18 determines that a gas leak in case (iii) has occurred.

Note that the anomaly determination unit 18 may only output the number of operations counted by the pressure valve 41 and the number of operations counted by the pressure release valve 42. Also in this case, the anomaly determination unit 18 may output the number of operations counted by the pressure valve 41 and the number of operations counted by the pressure release valve 42 by voice or by displaying text, graphics, or the like.

As described above, in the first embodiment, the vacuum circuit breaker 1A includes the pressure valve 41, the pressure release valve 42, the pressure sensor 15, and the anomaly determination unit 18. The pressure sensor 15 measures the gas pressure in the area A52. The pressure valve 41 opens when a pressure difference obtained by subtracting the gas pressure in the area A51, which is the area inside the movable-side frame 23, from the gas pressure in the area A52, which is the area outside the movable-side frame 23, exceeds the specific value P1, and closes when the pressure difference becomes equal to or lower than the specific value P1. The pressure release valve 42 opens when a pressure difference obtained by subtracting the pressure outside the grounded tank 10 from the gas pressure in the area A51 exceeds the specific value P2, and closes when the pressure difference becomes equal to or lower than the specific value P2. When the gas pressure sent from the pressure sensor 15 has become equal to or lower than the threshold, the anomaly determination unit 18 outputs anomaly information indicating that the gas pressure has become equal to or lower than the threshold.

Consequently, when a pressure anomaly occurs in the vacuum circuit breaker 1A, the pressure in the area A52 decreases. Thus, the vacuum circuit breaker 1A can monitor for pressure anomalies in the vacuum circuit breaker 1A with the single pressure sensor 15 disposed in the area A52. That is, the vacuum circuit breaker 1A can monitor both the area A51 and the area A52 for pressure anomalies with the single pressure sensor 15. Therefore, the vacuum circuit breaker 1A can achieve current interruption at low maintenance costs.

Furthermore, since the pressure valve 41 and the pressure release valve 42 include the counters that count the numbers of opening and closing operations, the anomaly determination unit 18 can determine which gas leak case has occurred, based on the number of operations counted by the pressure valve 41 and the number of operations counted by the pressure release valve 42. That is, the vacuum circuit breaker 1A can determine from which area to which area a gas leak has occurred.

Second Embodiment

Next, a second embodiment will be described with reference to FIG. 2. In the second embodiment, a pressure valve is disposed outside the grounded tank 10.

Figure 2:
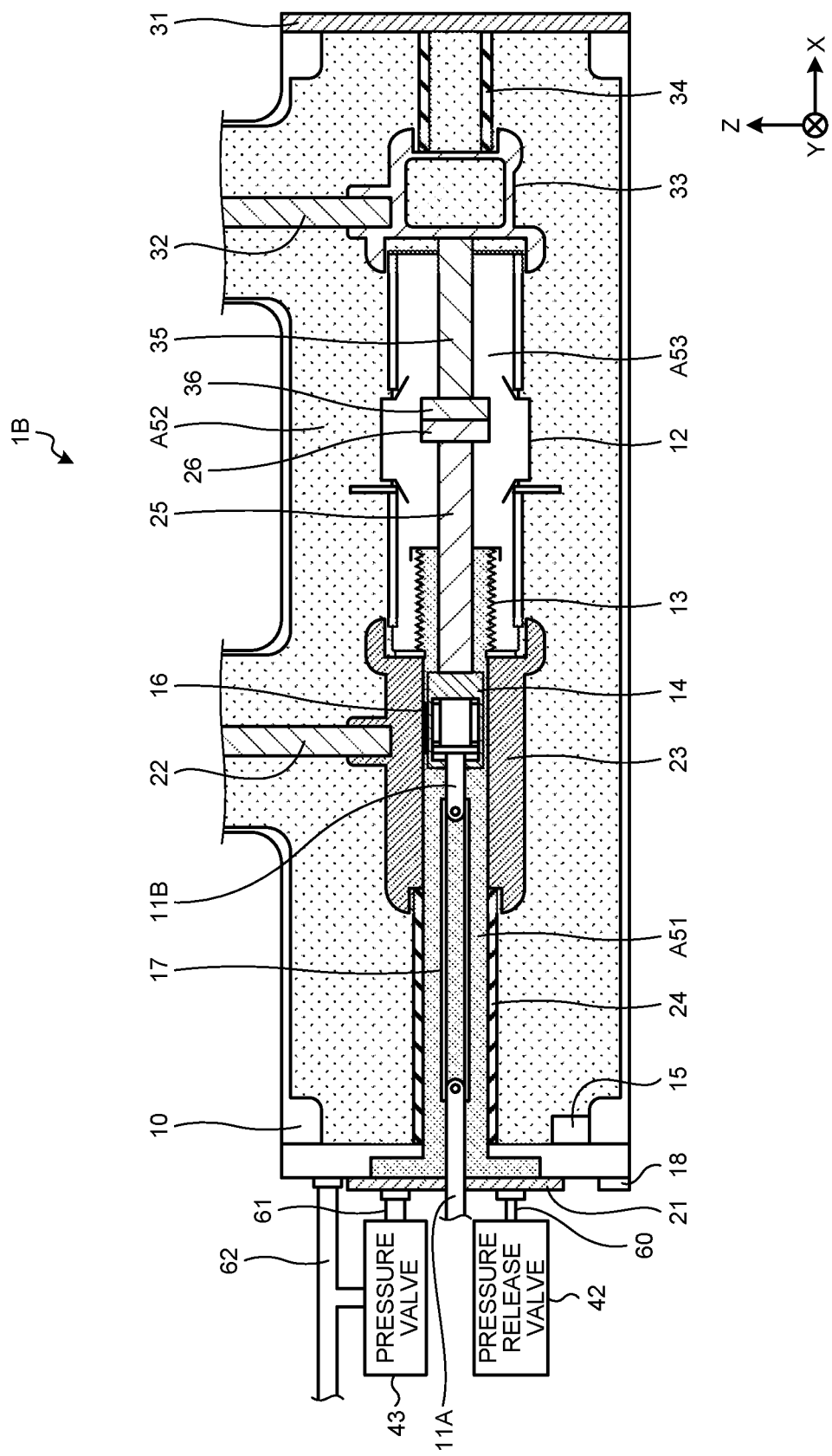
FIG. 2 is a diagram illustrating a configuration of a vacuum circuit breaker according to a second embodiment.

FIG. 2 is a diagram illustrating a configuration of a vacuum circuit breaker according to the second embodiment. FIG. 2 illustrates a cross-sectional view of a vacuum circuit breaker 1B. Of components in FIG. 2, components that achieve the same functions as those of the vacuum circuit breaker 1A of the first embodiment illustrated in FIG. 1 are denoted by the same reference numerals without duplicated explanations.

Compared to the vacuum circuit breaker 1A, the vacuum circuit breaker 1B includes a pressure valve 43 instead of the pressure valve 41. The vacuum circuit breaker 1B also includes gas pipes 61 and 62 disposed outside the grounded tank 10.

The pressure valve 43 is connected to the gas pipes 61 and 62. The gas pipe 61 is attached to the movable-side flange 21, and the gas pipe 62 is attached to the grounded tank 10. The gas pipe 61 is connected to the area A51 through the movable-side flange 21. The gas pipe 62 is connected to the area A52 through the grounded tank 10. With this configuration, the area A51 and the area A52 are connected via the pressure valve 43.

The pressure valve 43 includes a plurality of parts that need to be adjusted, such as a spring. The pressure valve 43 sends the gas in the area A52 to the area A51, like the pressure valve 41. The pressure valve 41 opens when the pressure difference between the gas pressure in the area A51 and the gas pressure in the area A52 exceeds the specific value P1, and closes when the pressure difference becomes equal to or lower than the specific value P1. The pressure valve 43 performs the same operation as the pressure valve 41.

Like the pressure valve 41, the pressure valve 43 may have a counter function to indicate the number of opening and closing operations. In this case, the anomaly determination unit 18 determines which gas leak case has occurred, based on the number of operations counted by the pressure valve 43 and the number of operations counted by the pressure release valve 42.

As described above, according to the second embodiment, since the pressure valve 43 is disposed outside the grounded tank 10, the vacuum circuit breaker 1B is improved in maintainability.

The configurations described in the above embodiments illustrate an example, and can be combined with another known art. The embodiments can be combined with each other. The configurations can be partly omitted or changed without departing from the gist.

REFERENCE SIGNS LIST 1A, 1B vacuum circuit breaker; 10 grounded tank; 11A, 11B shaft; 12 vacuum valve; 13 bellows; 14 contact pressure spring unit; 15 pressure sensor; 16 connecting member; 17 insulated operating rod; 18 anomaly determination unit; 21 movable-side flange; 22 movable-side bushing; 23 movable-side frame; 24 movable-side insulator; 25 movable-side electrode; 26 movable-side contact; 31 fixed-side flange; 32 fixed-side bushing; 33 fixed-side frame; 34 fixed-side insulator; 35 fixed-side electrode; 36 fixed-side contact; 41, 43 pressure valve; 42 pressure release valve; 60 to 62 gas pipe; A51 to A53 area.

The invention claimed is:

1. A vacuum circuit breaker, comprising:
a cylindrical grounded tank in which an insulating gas is sealed;
a vacuum valve insulated and supported in the grounded tank, the vacuum valve including a movable-side contact and a fixed-side contact;
a movable-side electrode electrically connected to the movable-side contact;
a fixed-side electrode electrically connected to the fixed-side contact;
a movable-side bushing extending above the grounded tank;
a fixed-side bushing extending above the grounded tank;

a movable-side frame electrically connecting a lower end of the movable-side bushing to the movable-side electrode;

a fixed-side frame electrically connecting a lower end of the fixed-side bushing to the fixed-side electrode;

an insulated operating rod to move the movable-side electrode;

a movable-side insulator insulating and supporting the movable-side frame in the grounded tank;

a fixed-side insulator insulating and supporting the fixed-side frame in the grounded tank;

a movable-side flange covering a movable-side end portion of the grounded tank;

a fixed-side flange covering a fixed-side end portion of the grounded tank;

a bellows disposed in the vacuum valve, the bellows allowing the movable-side electrode to pass through and being fixed to the movable-side electrode, to expand and contract with movement of the movable-side electrode;

a pressure valve to regulate pressure of the insulating gas between a first area enclosed by the bellows, the movable-side frame, the movable-side insulator, and the movable-side flange and a second area enclosed by the grounded tank, the movable-side flange, and the fixed-side flange outside the first area;

a pressure release valve to release the insulating gas from the first area to an outside of the grounded tank;

a pressure sensor to measure a gas pressure in the second area; and an anomaly determiner to determine whether or not the insulating gas has leaked from the grounded tank, based on the gas pressure measured by the pressure sensor, wherein a first gas pressure that is a gas pressure in the first area is lower than a second gas pressure that is the gas pressure in the second area, the pressure valve opens when a first pressure difference obtained by subtracting the first gas pressure from the second gas pressure exceeds a first specific value, and the pressure release valve opens when a second pressure difference obtained by subtracting a pressure outside the grounded tank from the first gas pressure exceeds a second specific value.

2. The vacuum circuit breaker according to claim 1, wherein
the pressure valve is disposed between the first area and the second area.

3. The vacuum circuit breaker according to claim 1, further comprising:
a first pipe disposed outside the grounded tank and connected to the first area; and
a second pipe disposed outside the grounded tank and connected to the second area, wherein
the pressure valve is connected to the first pipe and the second pipe outside the grounded tank.

4. The vacuum circuit breaker according to claim 1, wherein
the anomaly determiner determines that the insulating gas has leaked from the grounded tank when the second gas pressure falls below a guaranteed minimum gas pressure for the second area.

5. The vacuum circuit breaker according to claim 1, wherein
the pressure valve opens when the insulating gas leaks from the first area to the outside of the grounded tank, the first gas pressure decreases, and the first pressure difference exceeds the first specific value.

6. The vacuum circuit breaker according to claim 1, wherein
the pressure release valve opens when the insulating gas leaks from the second area to the first area, the first gas pressure increases, and the second pressure difference exceeds the second specific value.

7. The vacuum circuit breaker according to claim 1, wherein
the pressure valve and the pressure release valve count the respective numbers of opening and closing operations, and
the anomaly determiner determines from which area to which area the insulating gas has leaked, based on the numbers of operations.

* * * * *